(Model.)
J. Z. COOPER.
VETERINARY DRENCHER.
No. 260,457. Patented July 4, 1882.
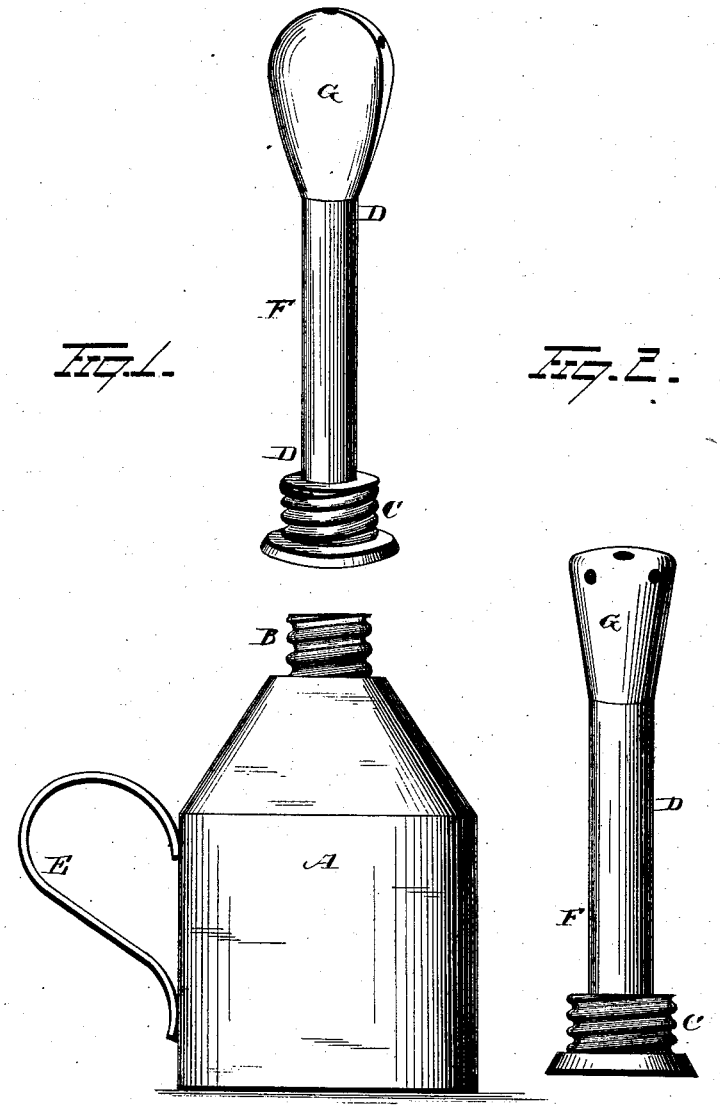
WITNESSES
Frank Bowen
Herman Moran.
INVENTOR
John Z. Cooper.
By Leggett & Leggett
Attorneys

UNITED STATES PATENT OFFICE.

JOHN Z. COOPER, OF ATHENS, GEORGIA.

VETERINARY DRENCHER.

SPECIFICATION forming part of Letters Patent No. 260,457, dated July 4, 1882.

Application filed February 3, 1882. (Model.)

*To all whom it may concern:*

Be it known that I, JOHN Z. COOPER, of Athens, in the county of Clarke and State of Georgia, have invented certain new and useful Improvements in Drenchers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in drenchers, the object being to provide an article of this character which will combine simplicity and cheapness of construction with durability and efficiency in use.

With these objects in view my invention consists in the combination, with a vessel to receive the medicine or potion, of a nozzle consisting of a tube provided at its outer end with a perforated enlargement or bulb, and devices adapting the nozzle to be removably secured to the vessel.

In the accompanying drawings, Figure 1 is a plan view of a drencher constructed in accordance with my invention, with the parts detached; and Fig. 2 is a view of a modified form of drenching tube or nozzle.

A is a vessel of any desired form, material, and construction. It is provided with a screw-threaded neck, B, over which the threaded cap C of the nozzle D is adapted to be screwed. The vessel may also be provided with a handle, E; but this may be dispensed with, if desired.

The nozzle D, which is preferably made of sheet metal, consists of a tube, F, and a perforated bulb or enlargement, G. The lower end of the said tube is secured over a perforation formed in the top of the cap C, while the bulb or enlargement aforesaid is secured to the outer end of the tube. If desired, however, the tube and bulb may be made integral with each other.

My invention is not limited to securing the nozzle to the vessel by means of the screw-threaded neck and cap, as shown in the accompanying drawings, for I may employ any other device that will permit the nozzle to be readily removed from and attached to the vessel.

Nozzles of different sizes and having bulbs or enlargements of different forms, such as may be the most appropriate for use with different animals, may accompany each vessel.

In use the nozzle is removed and the medicine or potion to be administered is introduced into the vessel. The nozzle is then replaced and the drencher is ready to be inserted into the mouth of the animal in the ordinary way.

The device is convenient in use. It is adapted to be readily cleansed. It presents no sharp points to tear the tissues of the animal's mouth or throat, and, moreover, it is not liable to be broken while in use.

I am aware that it is not broadly new to perforate the end of a veterinary implement. Hence I make no broad claim to the perforated nozzle; but

What I claim is—

A drencher for veterinary use, consisting of the combination, with a can or vessel, A, provided with a handle and a screw-threaded nozzle, B, of a nozzle consisting of a tube, F, provided with a screw-threaded cap, C, and the flattened bulb G, provided with a number of perforations, substantially as set forth.

In testimony that I claim the foregoing I have hereunto set my hand.

JOHN Z. COOPER.

Witnesses:
C. B. VERONE,
A. L. HULL.